United States Patent
Dalla Casa

(10) Patent No.: US 8,601,704 B2
(45) Date of Patent: Dec. 10, 2013

(54) MEASURING AND CHECKING APPARATUS

(75) Inventor: Mauriziò Dalla Casa, S. Giovanni in Persiceto (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 329 days.

(21) Appl. No.: 13/254,341

(22) PCT Filed: Mar. 25, 2010

(86) PCT No.: PCT/EP2010/053945
§ 371 (c)(1),
(2), (4) Date: Sep. 1, 2011

(87) PCT Pub. No.: WO2010/108990
PCT Pub. Date: Sep. 30, 2010

(65) Prior Publication Data
US 2011/0314685 A1    Dec. 29, 2011

(30) Foreign Application Priority Data
Mar. 27, 2009  (IT) .............................. BO2009A0191

(51) Int. Cl.
*G01B 3/46* (2006.01)
*G01B 5/12* (2006.01)

(52) U.S. Cl.
USPC ................................. 33/542; 33/556; 33/558

(58) Field of Classification Search
USPC ........ 33/542, 543, 544.4, 550, 556, 557, 558, 33/559, 560, 561, 827
See application file for complete search history.

(56) References Cited

U.S. PATENT DOCUMENTS

| | | | |
|---|---|---|---|
| 4,348,814 A | 9/1982 | Possati et al. | |
| 4,571,839 A | 2/1986 | Burton | |
| 5,189,808 A * | 3/1993 | Evans et al. | 33/836 |
| 7,412,778 B2 | 8/2008 | Golinelli | |
| 7,992,315 B2 * | 8/2011 | Nonni et al. | 33/558 |
| 8,033,032 B2 * | 10/2011 | Fujikawa et al. | 33/542 |
| 8,061,053 B2 * | 11/2011 | Gillan | 33/544 |

FOREIGN PATENT DOCUMENTS

| | | | | |
|---|---|---|---|---|
| CN | 101031774 A | | 9/2007 | |
| FR | 2496254 A | * | 6/1982 | G01B 3/46 |
| JP | 2010019783 A | * | 1/2010 | G01B 5/12 |
| WO | WO 2007/128805 A2 | | 11/2007 | |
| WO | WO 2008/049862 A1 | | 5/2008 | |

* cited by examiner

*Primary Examiner* — R. A. Smith
(74) *Attorney, Agent, or Firm* — Dickstein Shapiro LLP

(57) ABSTRACT

A plug gauge (1) includes a support and protection frame with a handle (2) that defines a longitudinal axis and houses a position transducer (25) and electronic devices for wirelessly transmitting electrical signals indicative of a dimension to be checked. The gauge also comprises a probe (6) including a mechanical armset (7) provided with at least one movable feeler (10), and a transmission mechanism with a stem (17) transmitting movements of the feeler to the position transducer housed in the handle. The probe is connected to the handle by means of a quick coupling mechanism (5) with deformable locking portions (52), the radial arrangement of which is controlled by a clamping element (60).

9 Claims, 6 Drawing Sheets

MEASURING AND CHECKING APPARATUS

TECHNICAL FIELD

The present invention relates to an apparatus for measuring and checking a mechanical piece including a support and protection frame with a hollow handle defining a longitudinal axis, a position transducer with a stationary part that is stationary with respect to the handle and a movable part that is movable along a substantially longitudinal direction, a probe, connected to the support and protection frame, which includes at least one movable feeler adapted for contacting the mechanical piece to be checked, and a transmission mechanism having a stem and a transmission system adapted to transform movements of the movable feeler into longitudinal movements of the stem, the stem being adapted to cooperate with the movable part of the position transducer and to transmit the longitudinal movements to the movable part of the position transducer; and a coupling mechanism for connecting the probe to the handle with transversal reference surfaces adapted to cooperate with reference surfaces of the probe for defining the longitudinal position of the probe with respect to the handle.

BACKGROUND ART

Checking apparatuses, for example the so-called "plug gauges", for checking dimensions and shape of mechanical pieces are known.

The U.S. Pat. No. 4,348,814 discloses examples of such gauges, wherein a measuring armset connected to a support element includes two feelers that are fixed to movable arms at diametrically opposed positions for touching the surface of a hole to be checked.

A transducer detects mutual movements of the movable arms and provides, by means of cable wires, external processing and display devices with electrical signals indicative of the mutual position of the feelers.

Wireless plug gauges are also known, wherein the signals indicative of the dimension to be checked and generated by the transducer are wirelessly sent to external units for being processed and displayed.

The known plug gauges can be manually operated and typically include a support and protection frame with a handle that has an external surface serving as gripping for an operator's hand and a probe including mechanical devices for detecting the hole dimensions. The probe can be disengaged from the main body in order to be replaced by another probe depending on the checking to be carried out, for example depending on the nominal diameter of the hole to be checked.

The U.S. Pat. No. 4,571,839 discloses an example of such manual plug gauges including a probe that can be disengaged and replaced. The illustrated plug gauge is provided with a cable power supply and a cable transmission of the measure, and the probe is connected to a hollow support and protection frame serving as handle. The probe, which includes a measuring cell with a transducer, is connected to the hollow tubular frame by means of a mechanical coupling consisting of a radial screw that passes through a through bore located in the tubular frame and engages a circular groove located in the probe.

Inside the handle there are electrical cables of the transducer that are coupled to external electrical cables by means of corresponding connectors for enabling the transmission of signals and the power supply.

The plug gauge disclosed in U.S. Pat. No. 4,571,839 ensures flexibility in use thanks to the possibility of replacing the probe depending on the checking to be performed. However, such a replacing operation is not quite easy owing to the adopted coupling system and the arrangement of the electrical connectors that are hard to reach. The probes alternatively used in the plug gauge according to U.S. Pat. No. 4,571,839 each include, as stated, a measuring cell that comprises, in addition to the transducer, feelers and an armset for transmitting to the transducer the movements of the feelers. The probes to be used to fit the gauge to different nominal dimensions are thus rather complex and expensive. Moreover, in the event of breakage of just the mechanical part or just the electrical part of the probe, it is necessary to replace the whole probe or at least the whole measuring cell.

The international patent applications published under Nos. WO-A-2007/128805 and WO-A-2008/049862 disclose some types of plug gauges that are provided with wireless transmission of signals and have replaceable probes. According to some embodiments of publication WO-A-2007/128805, each probe includes the feelers and a mechanical transmission system, while another intermediate element between the probe and the handle, or interface, includes the transducer and the electrical connector. Probes, interface and handle are connected by means of threaded couplings, and, even though the system provides advantages in terms of flexibility of use, the replacing operations for fitting specific nominal dimensions to be checked require a not negligible amount of skill and time. Moreover, the longitudinal dimensions of the gauge can not be smaller than a limit value which could be too great for certain applications.

DISCLOSURE OF THE INVENTION

Object of the present invention is to provide gauges of the modularized type that improve the features of the known gauges in terms of flexibility, convenience and compactness, and enable to reduce costs and time for fitting different measuring ranges and/or different kinds of checking.

This and other objects are achieved by an apparatus according to claim 1.

An apparatus for measuring and checking mechanical pieces according to the present invention includes a support and protection frame with a hollow handle that defines a longitudinal axis and houses a position transducer having a stationary part and a movable part which is movable along a substantially longitudinal direction. A probe, with at least one movable feeler and a transmission mechanism for transforming movements of the feeler into longitudinal movements of a stem, is connected to the support and protection frame by means of a quick coupling mechanism. The quick coupling mechanism is fixed to the handle and includes transversal reference and abutment surfaces for the probe defining a longitudinal operative position of the latter and locking portions. The radial arrangement of the locking portions, preferably deformable, is controlled by means of a clamping element, for example a ring nut coaxial with the longitudinal axis, for locking and unlocking the probe.

Preferably, the position transducer is of the inductive type, and a bearing and guide element houses stationary windings inside of which a magnetic core fixed to an associated support element can longitudinally slide. By virtue of the transmission mechanism, displacements of the probe feeler cause such support element to move, guided by external surfaces of the bearing and guide element.

In a preferred embodiment, the feeler of the probe can transversally displace.

In an apparatus according to the present invention, the number of the component parts is advantageously optimized for ensuring a remarkable ease and flexibility of use while maintaining operation reliability and accuracy, reducing production and management costs, and enabling to have a particularly compact structure with reduced overall dimensions.

Moreover, the combination of the above-described coupling mechanism and the wireless transmission system, according to the preferred embodiment of the invention, ensures a particular flexibility of use and ease in retooling and handling component parts that can be replaced in a very simple and rapid way.

BRIEF DESCRIPTION OF THE DRAWINGS

The invention is now described in detail with reference to the enclosed sheets of drawings, given by way of non-limiting example, wherein.

BEST MODE FOR CARRYING OUT THE INVENTION

The figures show a measuring and checking apparatus, more specifically an electric gauge for manually checking linear dimensions of a mechanical piece, according to the present invention. In the embodiment of FIGS. 1 to 5 such gauge is a plug gauge 1, for checking internal diametral dimensions, provided with a wireless transmission of measuring signals. The plug gauge 1 includes a support and protection frame with a hollow handle 2 that defines a longitudinal axis and is shaped in such a way that its central portion has ergonomic shape for the manual use of the gauge. The handle 2 has a control push button 3 for enabling an operator to manually select the required function of the gauge 1, such as, for example, switching on or switching off the gauge 1, or wirelessly transmitting signals indicative of the checked dimension to a processing and display unit shown in simplified way in FIG. 1 and marked with the reference number 13. Near the push button 3 there is a LED indicator showing the state of the gauge 1 and/or the function selected by the push button 3.

Figure 1:
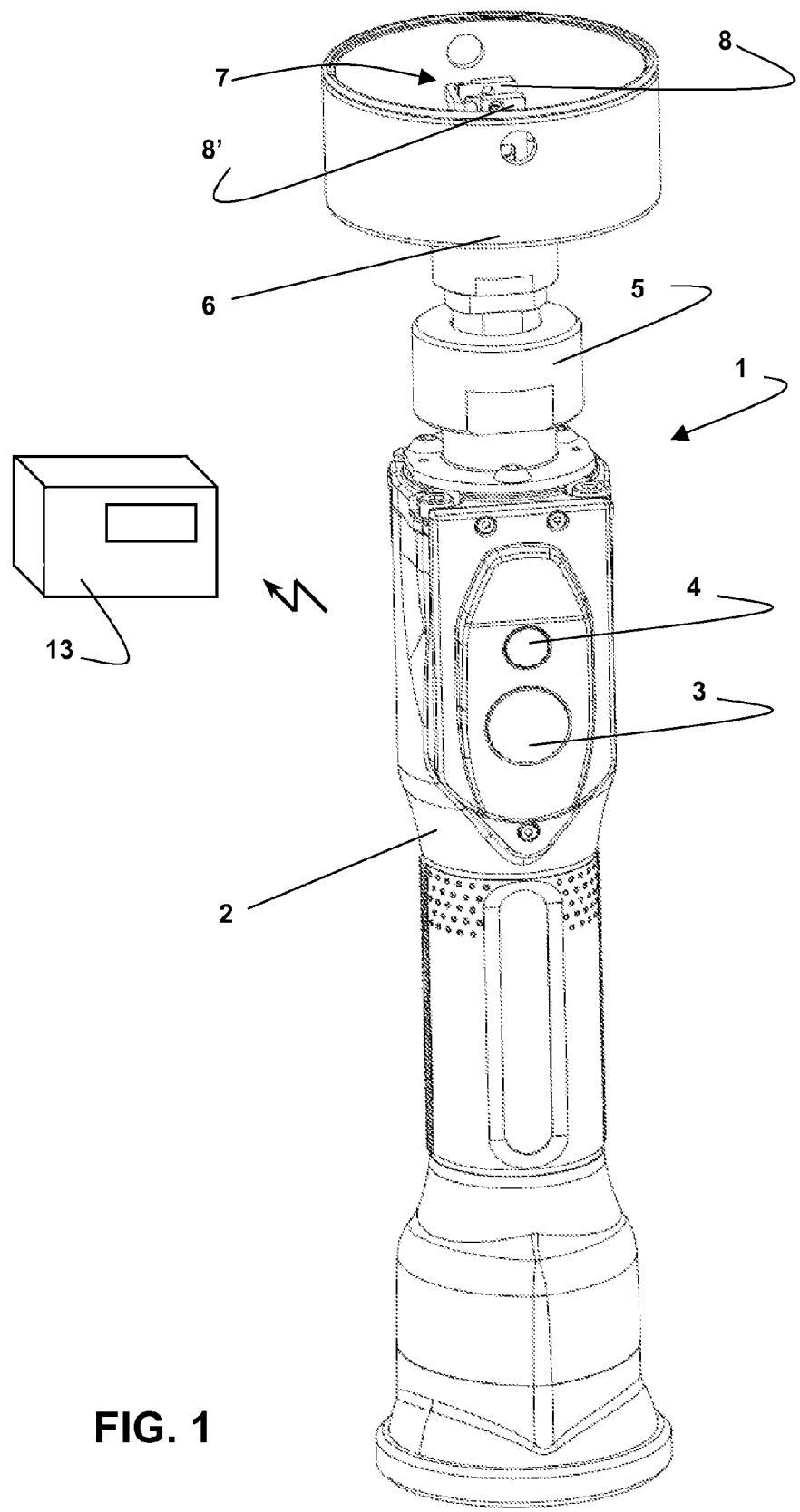
FIG. 1 is a perspective view of a gauge, more specifically a plug gauge, according to the invention with some parts removed for the sake of simplicity.
Figure 2:
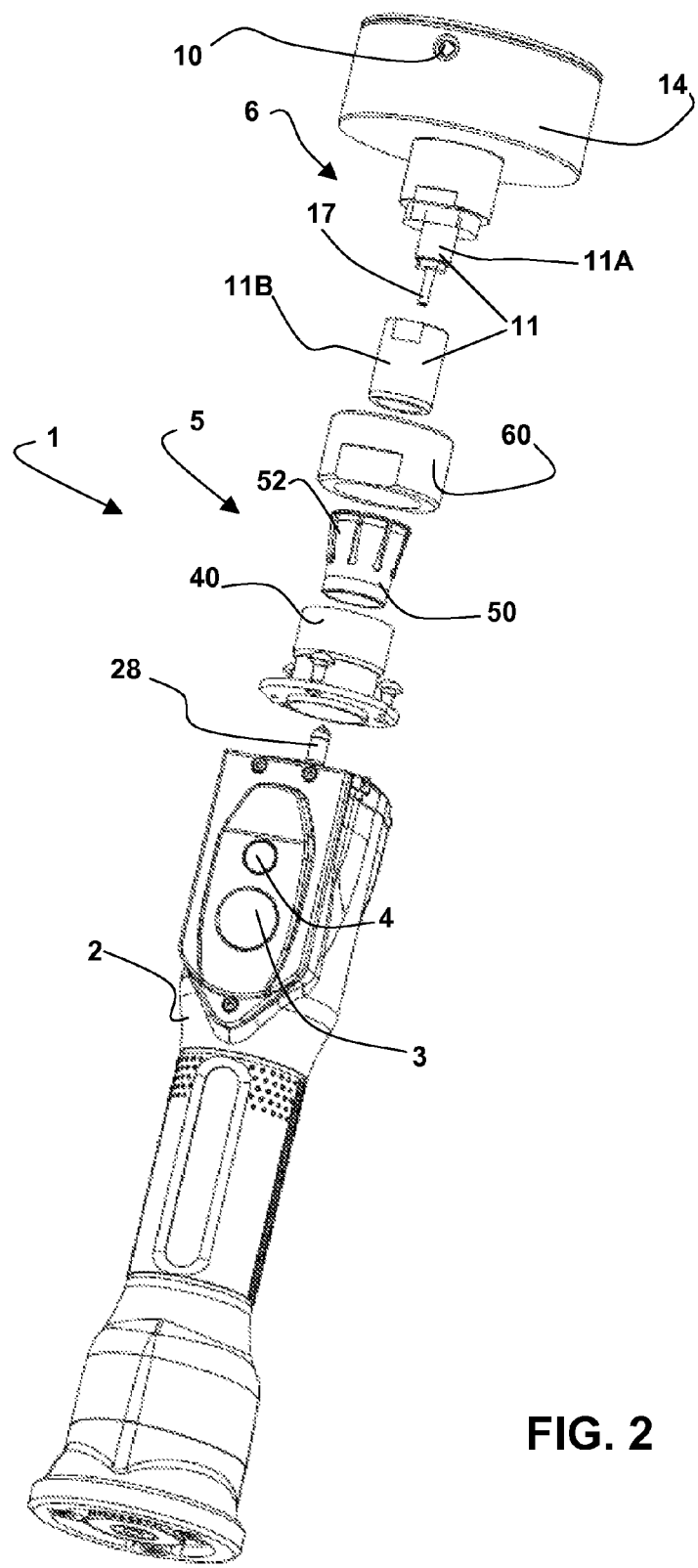
FIG. 2 is a perspective exploded view of the plug gauge of FIG. 1, taken from a different point of view and shown on a different scale with respect to FIG. 1.

A probe 6 is connected to the handle 2—by means of a coupling mechanism 5 that will be hereinafter described in more detail—and includes a mechanical armset 7, which is per se known and only partly visible in FIGS. 1, 3 and 4, consisting of, for example, two arm assemblies 8, 8' provided each with fulcrum areas 9 lying on parallel axes and carrying respective movable feelers 10 aimed to touch the surface of a cylindrical hole to be checked at diametrically opposed positions. The free ends of the arm assemblies 8 and 8' are visible in FIG. 1, while the sections of FIGS. 3 and 4 only show part of the arm assembly 8 and two of the respective fulcrum areas 9. Only one movable feeler 10 is schematically shown in FIGS. 2 and 4.

The probe 6 further includes a support assembly 11, with mutually coupled components 11A and 11B, the former carrying the mechanical armset 7 and the latter defining a substantially cylindrical clamping surface 12. A centering nosepiece 14 is fixed to the support assembly 11 of the probe 6, and its end can be closed by a protecting cap not illustrated for the sake of clarity. The arm assemblies 8, 8' of the mechanical armset 7 include suitably sloping abutment surfaces 16 (per se known and only partly visible in FIGS. 3 and 4) and define a transmission system of a transmission mechanism that comprises a stem 17, too. The stem 17 can axially slide, guided by a guide bushing 18 connected to the support assembly 11, and has a substantially ball shaped end 20 which keeps the contact with the abutment surfaces 16 thanks to the thrust applied by a spring 19. The opposite end 21 of the stem 17 is free and has a substantially plane surface.

A position transducer 25 having a stationary part and a movable part is housed in the handle 2 of the plug gauge 1. The position transducer 25 is for example of the inductive type, and the stationary part includes windings 26, while the movable part consists of a magnetic core 24 movable inside the windings 26 along a longitudinal direction (for the sake of simplicity, in FIGS. 3 and 4 the windings, per se known, are not explicitly drawn and the reference number 26 actually marks the seat housing these windings). A bearing and guide element 27 is fixed inside the handle 2 and defines a housing for the windings 26. A movable support element 28 carries the magnetic core 24 by means of a rod 29 and includes a hollow enlarged portion having an internal substantially cylindrical surface 30. The bearing and guide element 27 defines an external substantially cylindrical guide surface 32 that cooperates with the internal surface 30 for guiding the longitudinal movements of the movable support element 28. A contact element 33 having a substantially ball shaped free surface is connected to the movable support element 28 in such a way to be longitudinally adjustable, while a compression spring 35 acts between the bearing and guide element 27 and the movable support element 28 by applying to the latter a longitudinal thrust toward the outside of the handle 2.

A wireless transmission system, for example of the radio-frequency type, is housed in the handle 2 and is electrically connected to the transducer 25. The reference number 15 in FIG. 3 marks in a schematic way such transmission system and other electronic devices comprising electronic circuits for processing electrical measuring signals provided by the position transducer 25, electronic circuits for handling the push button 3 and the LED indicator 4, and electronic circuits for handling the power supply provided by one or more batteries 23 housed in the central part of the handle 2. According to a preferred embodiment of the invention, the wireless transmission system enables to emit radio-frequency signals by means of an antenna located inside the handle 2 and marked with the reference number 22 in FIG. 3. In substance, the handle 2 includes all the electrical/electronic components, including the position transducer 25 and the circuits enabling the power supply and the signal transmission, while the probe 6 only includes mechanical components, as the mechanical armset 7 and the transmission mechanism with the stem 17.

As previously stated, the probe 6 is connected to the handle 2 by means of a coupling mechanism 5 enabling a mutual location and a quick fastening.

Figure 3:
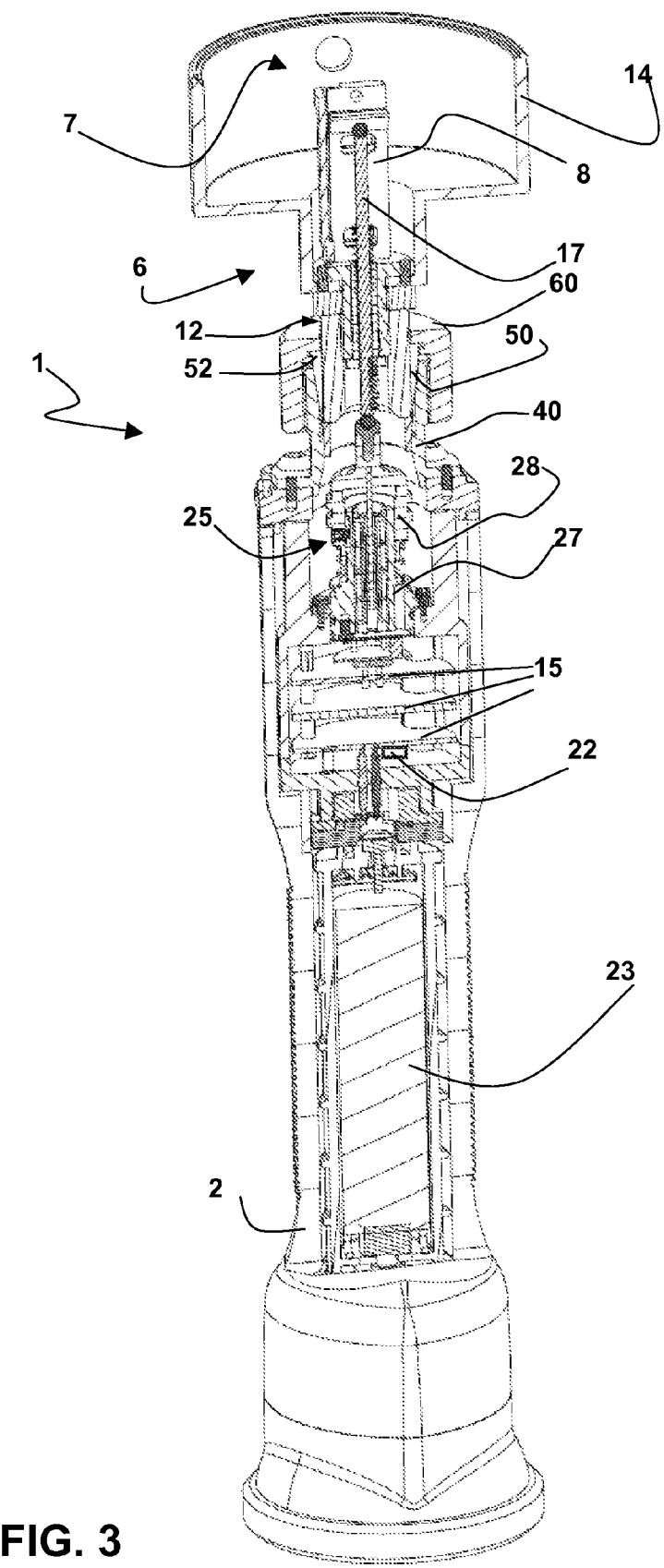
FIG. 3 is a perspective, longitudinally sectioned view of the plug gauge of FIG. 1.
Figure 4:
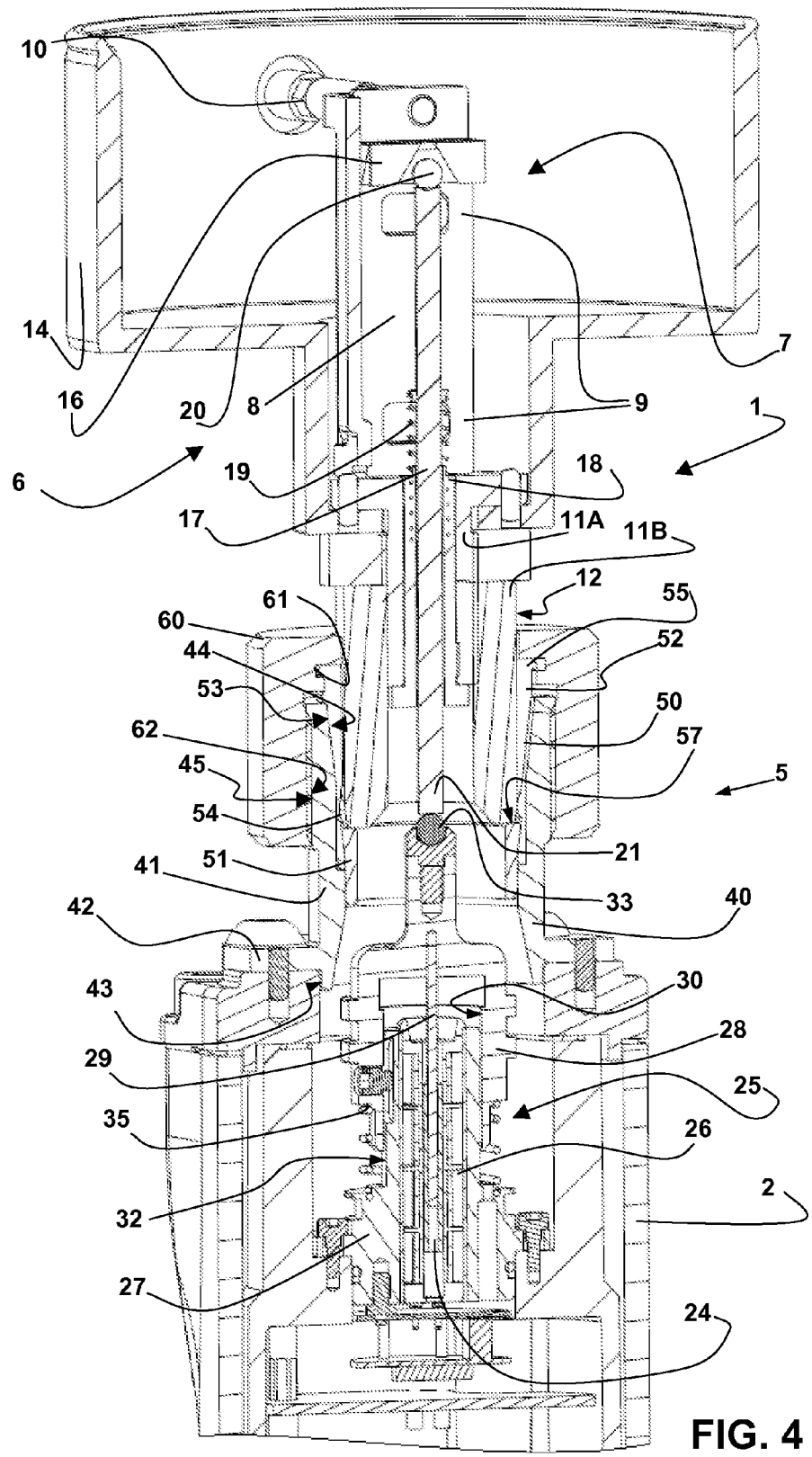
FIG. 4 is an enlarged view of a part of FIG. 3, wherein a feeler is additionally shown.
Figure 5:
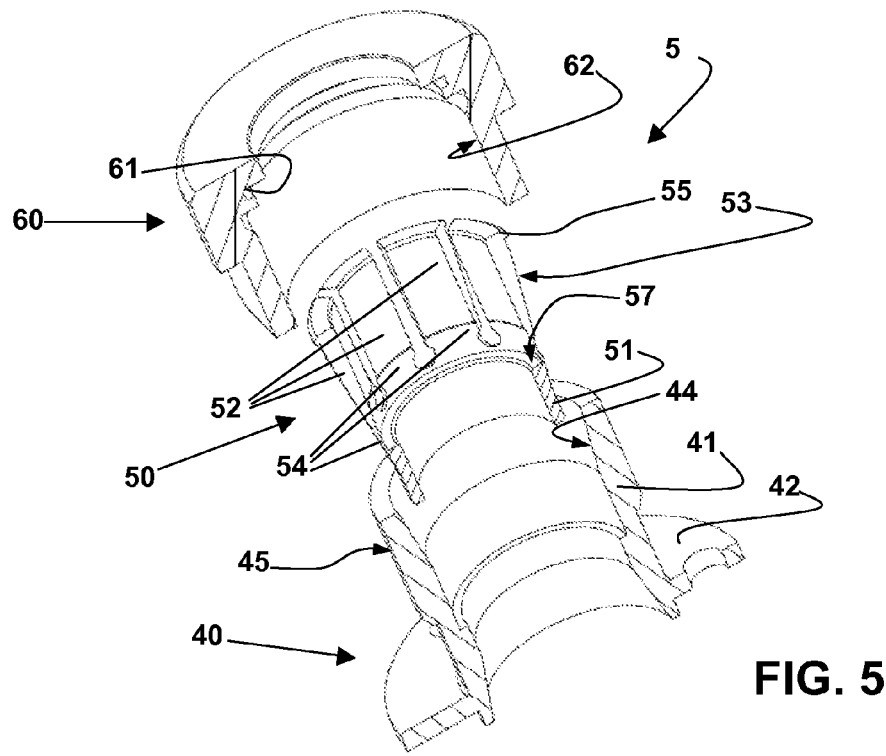
FIG. 5 is a perspective, exploded, sectioned and enlarged view of some component parts of a coupling mechanism of the plug gauge shown in the previous figures.

The coupling mechanism 5 substantially includes three elements that are visible in FIGS. 3 and 4 in the assembled plug gauge and are shown disassembled in FIGS. 2 and 5. The three elements are: a base component 40, an intermediate element 50 and a clamping element or threaded ring nut 60.

The base component 40 has a substantially cylindrical, tubular main portion 41 and a fastening flange 42 that is joined to an open end of the handle 2 by means of screws. Suitable radial limiting surfaces, marked with the reference number 43 in FIG. 4, define the position of the base component 40 so that the latter is centered with respect to the longitudinal axis of the handle 2. The internal surface of the base component 40 defines substantially cylindrical areas and an internal sloping surface 44 diverging toward a free end of the main portion 41 that has in particular a truncated cone shape, while at such free end an external threaded surface 45 is defined.

The intermediate element 50 has a particular tubular shape with variable section clearly visible in FIGS. 2 and 5, and is provided with an annular portion 51 and locking portions 52 that define external sloping surfaces 53, the envelope of which has a truncated cone shape.

More specifically, the locking portions 52 are integrally connected to the annular portion 51 at deformable, reduced thickness areas 54, are circularly adjacent and define internal sectors with cylindrical surface and external sloping surfaces 53, i.e. sectors with sloping surface, having in particular a truncated cone shape. The free ends of the locking portions 52 define portions of a circular, radially projecting edge 55. Moreover, the intermediate element 50 defines a transversal reference surface 57, the latter lying inside the intermediate element 50 at the annular portion 51.

The intermediate element 50 is coaxially arranged inside the base component 40 in such a way that the sectors with sloping surface defined by the locking portions 52 contact the internal sloping surface 44.

The threaded ring nut 60 defines an internal circular groove 61 and has an internal threaded portion 62 that is coupled to the external threaded surface 45 of the base component 40. The circular edge 55 defined by the ends of the locking portions 52 is housed into the circular groove 61, and the threaded ring nut 60, which is screwed to the base component 40, applies to the intermediate element 50 a thrust along the longitudinal axis.

When the probe 6 is going to be connected to the handle 2, the elements of the coupling mechanism 5 are coupled in the above described way and the threaded ring nut 60 is only partly screwed to the base component 40, the intermediate element 50 being disposed between the former and the latter. The probe 6 is inserted into the central opening of the coupling mechanism 5 until reference surfaces of the probe 6, more specifically a transversal end surface of the support assembly 11 (more specifically of component 11B) abuts against the transversal reference surface 57 defined inside the intermediate element 50. Once the suitable angular position of the probe 6 about the longitudinal axis is manually determined, the locking is implemented by acting on the threaded ring nut 60 so that the latter is further screwed to the base component 40. In this way, further to the longitudinal thrust applied by the threaded ring nut 60 aiming to push the intermediate element 50 into the opening of the base component 40, the action of the internal sloping surface 44 on the external sloping surfaces 53 causes centripetal displacements of the locking portions 52 that change their radial arrangement owing to the deformation of the reduced thickness areas 54. Further to these displacements, the locking surfaces 52 close on the clamping surface 12 defined by the support assembly 11, and this enables not only to implement the coupling between the probe 6 and the handle 2, but also to lock such coupling.

It should be noted that the deformable locking portions 52 can be implemented in a different way with respect to what is shown in the figures, for example by using portions with substantially constant section that can intrinsically deform thanks to a particular shape or the choice of materials or other reasons.

When the probe 6 is connected to the handle 2 in the suitably defined position, the movable support element 28 of the transducer 25 and the stem 17 are aligned along the longitudinal axis, and in particular the contact element 33 is urged by the compression spring 35 against the free end 21 of the stem 17.

During the checking operations, for example for checking the diametral dimensions of a hole, transversal movements of the feelers 10 (or just of one of them) are transmitted by means of the transmission system, which features the sloping abutment surfaces 16 and the ball shaped end 20 of the stem 17, to the stem 17 that transmits, in turn, longitudinal displacements to the movable support element 28 and thus to the core 24 translating among the windings 26. Electrical signals that are consequently generated by the transducer 25 and that are indicative of the diametral dimensions to be checked are transmitted by the plug gauge 1 to the display and processing unit 13 by means of the wireless transmission system provided with the antenna 22.

Figure 6A:
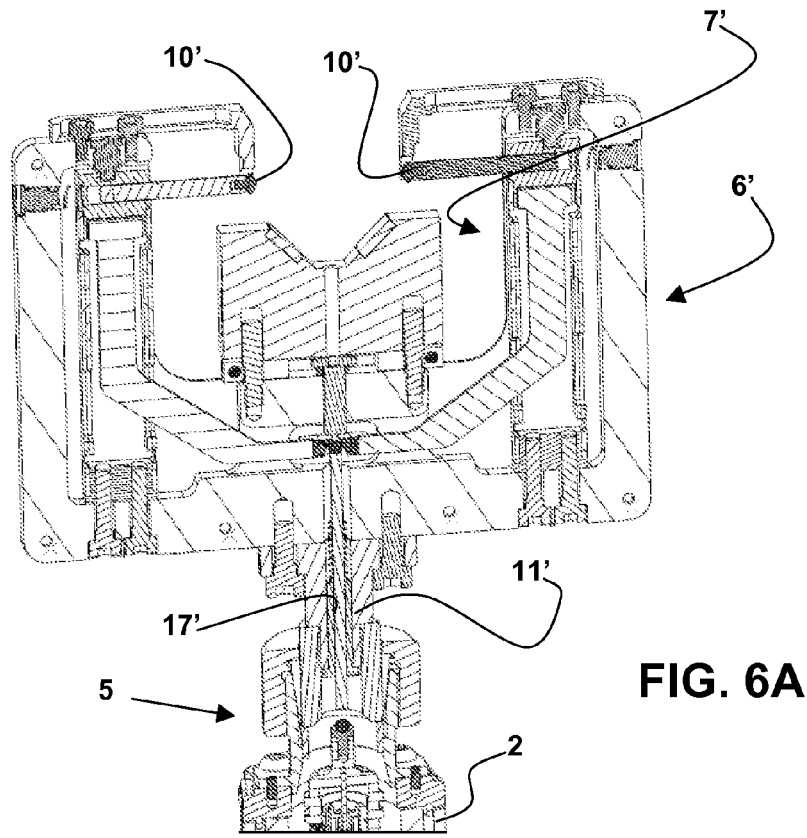
FIGS. 6A, 6B and 6C are perspective, partial and longitudinally sectioned view of different gauges according to the invention.
Figure 6B:
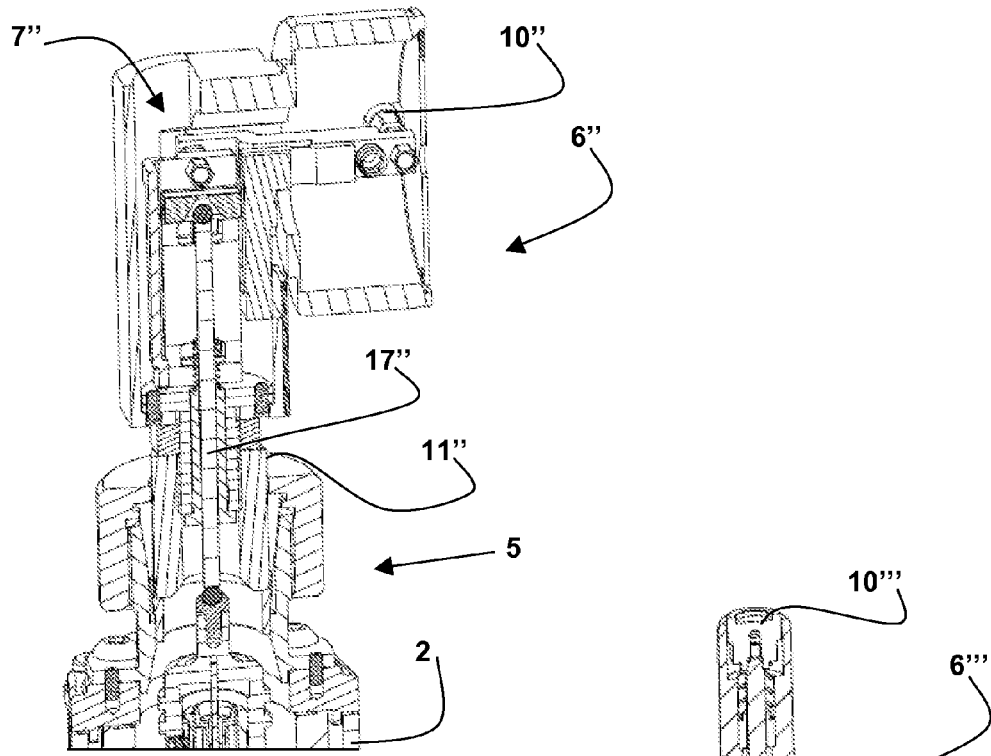
Figure 6C:
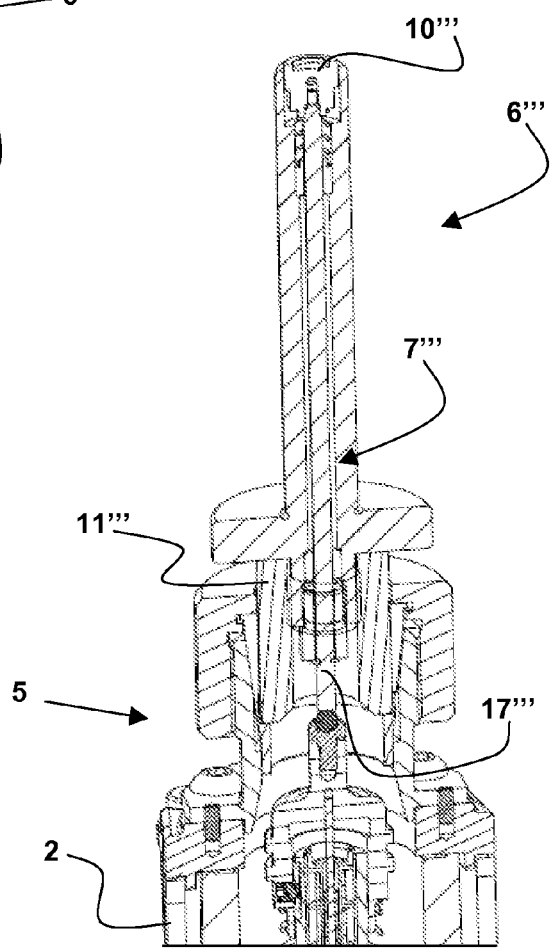

The probe 6 that only includes, as previously stated, simple mechanical component parts can be rapidly removed by unloosing the screw of the thread ring nut 60 and easily replaced by a probe 6 with different dimensions and/or shape in order to check a piece with different characteristics, such as a piece with a hole with a different nominal diameter, or to carry out a different kind of checking. FIGS. 6A, 6B and 6C show examples of different probes that, in a gauge according to the present invention, can alternatively be connected to the handle 2 by means of the coupling mechanism 5.

More specifically, FIG. 6A shows a gauge 6' that is adapted to check external diameters of mechanical parts and includes a support assembly 11' and a per-se known mechanical armset 7' carrying a couple of feelers 10', with a transmission system comprising a stem 17'.

FIG. 6B shows a gauge 6" that is adapted to check internal diametral dimensions of transversally arranged holes and includes a support assembly 11" and a per-se known mechanical armset 7" carrying a couple of feelers 10" (only one of them is shown in the figure), with a transmission system comprising a stem 17".

FIG. 6C shows a gauge 6''' that is adapted to check distances along a longitudinal direction and includes a support assembly 11''' and a per-se known mechanical armset 7''' carrying an axial feeler 10''', with a very simple transmission system comprising a stem 17'''.

Even in case of breakage of parts of the probe 6, the replacement can be easily carried out, and in any case the position transducer has not to be replaced or removed.

Moreover, the use of the disclosed position transducer 25, including the particular bearing and guide element 27 and movable support element 28, provides remarkable advantages especially in terms of compactness, by ensuring a relatively wide measuring range with limited longitudinal overall dimensions.

A gauge according to the invention also enables to use position transducers of a different type, for example inductive transducers including guide surfaces that are longitudinally aligned and placed at a distance from the magnetic core, or transducers of other types including, for example, optical devices.

The hereinbefore described gauge can be modified without departing from the scope of the present invention.

The coupling mechanism between the probe and the handle is hereinbefore described with reference to a manual plug gauge (FIGS. 1 to 5) of the electric type with a wireless transmission for checking internal diametral dimensions, but it can also be used in plug gauges or gauges of different types. It can be employed, for example, in gauges that are aimed to check external diameters or form deviations, or are provided with mechanical transmission and/or cable transmission. It can also be automatically employed in mechanical arms or machine tools. Moreover, it is possible to use probes for concurrently checking more than one section of a same mechanical piece including one or more armsets with parallelogram cells, or fulcrum cells. Checking apparatuses differing from gauges, for example including checking devices that can provide information relating to absolute dimensions of the pieces to be checked, fall within the scope of the present invention, too.

The invention claimed is:

1. An apparatus for measuring and checking a mechanical piece comprising:
    a support and protection frame with a hollow handle defining a longitudinal axis;
    a position transducer with a stationary part that is housed in the handle and is stationary with respect to the handle and a movable part that is movable along a substantially longitudinal direction;
    a probe, connected to the support and protection frame, which includes at least one movable feeler adapted for contacting the mechanical piece to be checked, and a transmission mechanism having a stem and a transmission system adapted to transform movements of said movable feeler into longitudinal movements of the stem, the stem being adapted to cooperate with the movable part of the position transducer and to transmit said longitudinal movements to said movable part of the position transducer; and
    a coupling mechanism for connecting the probe to the handle with transversal reference surfaces adapted to cooperate with reference surfaces of the probe for defining the longitudinal position of the probe with respect to the handle,
    said coupling mechanism being fixed to the support and protection frame and including locking portions with a modifiable radial arrangement adapted to cooperate with the probe and a clamping element adapted to control the radial arrangement of said locking portions for locking and unlocking the probe to the coupling mechanism.

2. The apparatus for measuring and checking according to claim 1, wherein said at least one movable feeler is adapted to perform movements along a transversal direction, the transmission system being adapted to transform said movements along a transversal direction of said at least one movable feeler into longitudinal movements of the stem.

3. The apparatus for measuring and checking according to claim 1, wherein said locking portions are deformable locking portions.

4. The apparatus for measuring and checking according to claim 3, wherein the coupling mechanism includes a substantially tubular base component, which is fixed to the handle and aligned along a longitudinal direction, and an intermediate element, which is partly inserted into the base component and includes the deformable locking portions and the transversal reference surfaces.

5. The apparatus for measuring and checking according to claim 4, wherein the clamping element includes a threaded ring nut with an internal threaded portion adapted to cooperate with an external threaded surface of the base component, the base component including an internal sloping surface, the intermediate element including external sloping surfaces and deformable areas of the locking portions, said internal sloping surfaces and external sloping surfaces being adapted to mutually cooperate under the control of a longitudinal thrust which is applied by the threaded ring nut for causing deformations of said deformable areas and a consequent change of the radial arrangement of the locking portions.

6. The apparatus for measuring and checking according to claim 1, wherein the position transducer is of the inductive type, and the stationary part includes windings fixedly housed in the handle, the movable part including a magnetic core which is longitudinally movable inside the windings, the magnetic core being connected to a longitudinally movable support adapted to cooperate with said stem.

7. The apparatus for measuring and checking according to claim 6, wherein the position transducer comprises a bearing and guide element which is fixed inside the handle, houses said windings and comprises an external guide surface adapted to cooperate with internal surfaces of said movable support for guiding longitudinal displacements of the movable support.

8. The apparatus for measuring and checking according to claim 1, including a wireless transmission system for wirelessly transmitting the electrical signals of the position transducer, said wireless transmission system comprising at least an emitter which is connected to said position transducer and housed in the handle.

9. The apparatus for measuring and checking according to claim 8, wherein said transmission system is of the radio-frequency type, and said emitter is an antenna.

* * * * *